United States Patent [19]

Kells et al.

[11] 4,343,292

[45] Aug. 10, 1982

[54] VAPOR JACKETED COOKING VESSEL

[75] Inventors: Edward L. Kells, Batavia; Robert L. Narowski, Park Ridge, both of Ill.

[73] Assignee: Groen Division/Dover Corporation, Elk Grove Village, Ill.

[21] Appl. No.: 123,386

[22] Filed: Feb. 21, 1980

[51] Int. Cl.³ .............................................. A47J 27/06
[52] U.S. Cl. ..................................... 126/378; 126/390
[58] Field of Search ............... 126/378, 377, 382, 391, 126/389, 343.5 A, 343.5 R, 390, 20.1, 20.2, 33; 165/105, 154, 142; 99/293; 220/428; 219/439, 341, 325, 326, 462, 430, 401, 399

[56] References Cited

U.S. PATENT DOCUMENTS

| 1,403,471 | 1/1922 | Field | 165/105 |
| 1,619,660 | 3/1927 | Field | 126/377 |
| 2,372,502 | 3/1945 | Lehane et al. | 165/154 X |
| 2,513,254 | 6/1950 | Savage et al. | 165/154 X |
| 3,791,372 | 2/1974 | Hatsopoulos et al. | 126/390 |
| 3,958,627 | 5/1976 | Edelstein | 165/105 X |
| 4,105,895 | 8/1978 | Kennedy | 165/105 X |
| 4,145,604 | 3/1979 | Carlsson | 219/439 |

FOREIGN PATENT DOCUMENTS 465781 6/1950 Canada ............................... 219/439

Primary Examiner—Samuel Scott
Assistant Examiner—Randall L. Green

[57] ABSTRACT

An improved vapor jacketed cooking vessel having an integrally contained fired-tube vapor generator, thus making it independent of outside vapor supply.

3 Claims, 14 Drawing Figures

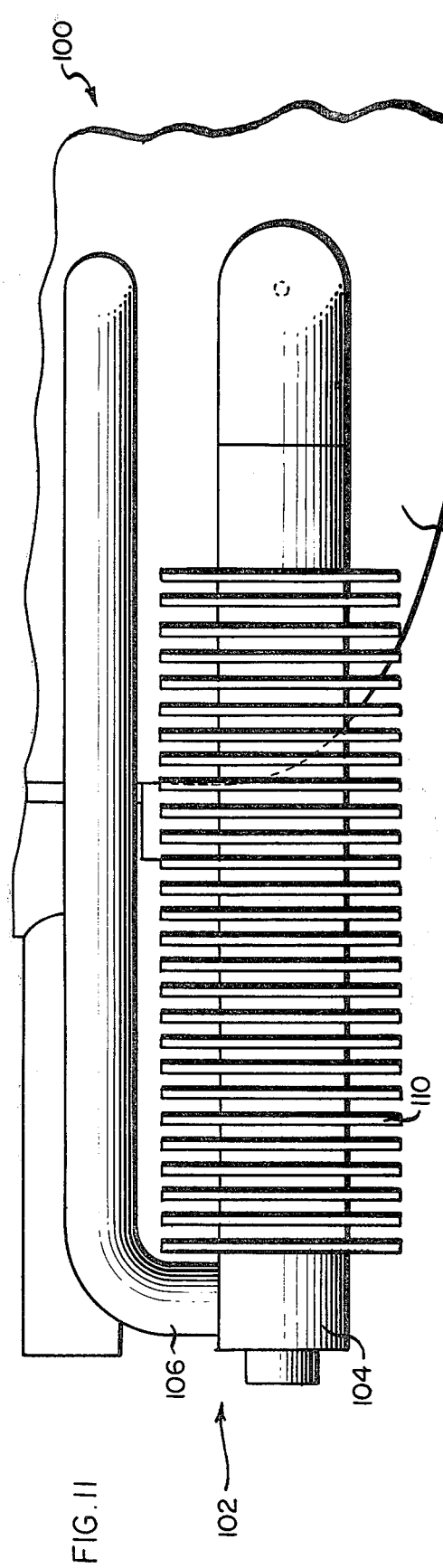
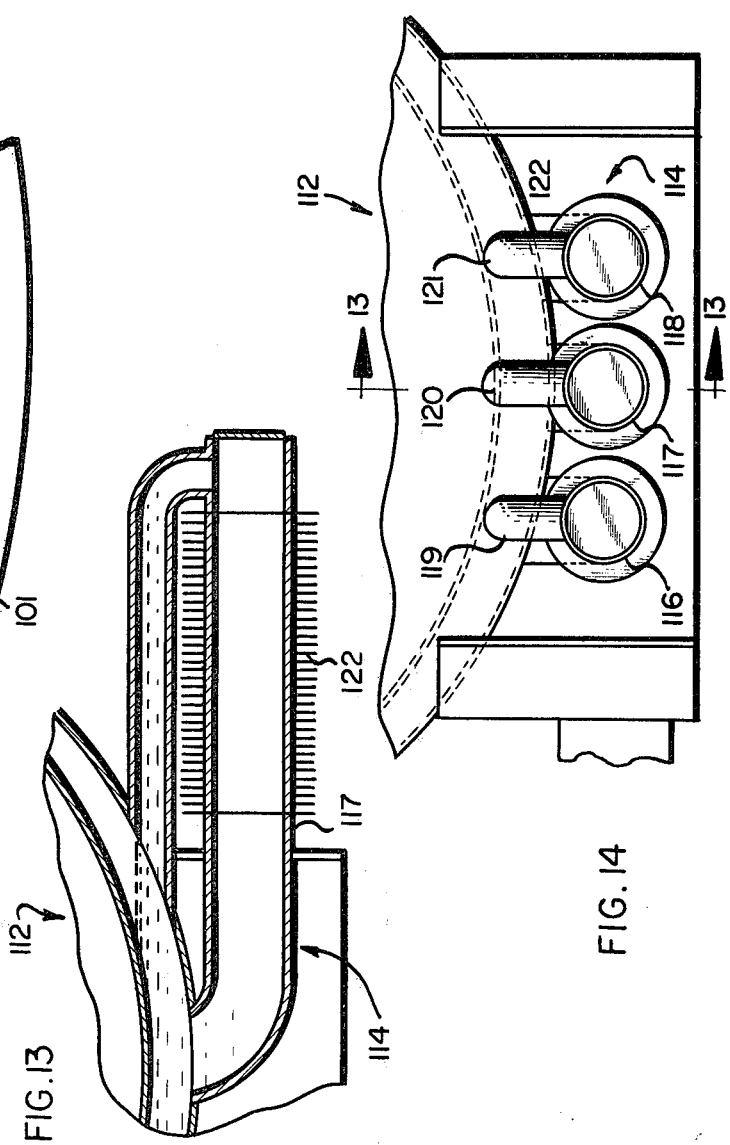
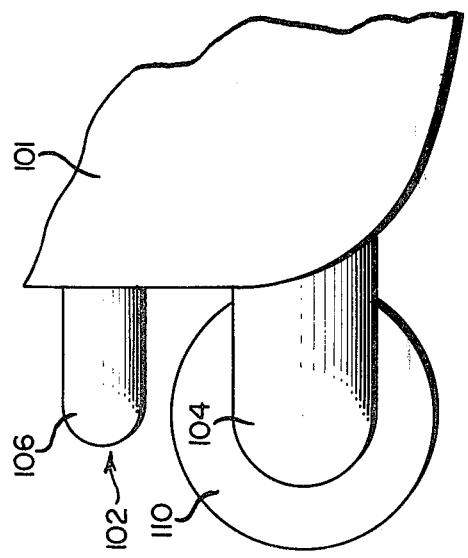
FIG. 11
FIG. 13
FIG. 14
FIG. 12

VAPOR JACKETED COOKING VESSEL

BACKGROUND OF THE INVENTION

This invention relates to improvements in vapor jacketed cooking vessels which integrally contain fired vapor generators, thus making them independent of outside vapor supply.

Vapor jacketed cooling vessels of the above-described type are used for the concentration, cooking and heating of a wide variety of liquids, slurries, emulsions and other like products where the vessel wall temperature must be controlled to prevent damage to the contained product. They are available in many standard sizes and built to any practical size. The construction basically is to enclose the vessel in an appropriate jacket which will thus surround the major portion of the vessel with hot vapor, which vapor condenses on the outside of the vessel and transfers heat thereto. An appropriate quantity of working fluid is kept in the jacket, and the vapor is generated in the evaporator portion of the jacket, which is usually the bottom thereof. The most common working fluid is water, although numerous other fluids such as alcohol, glycol, Freons, Dowtherms and the like are well known and have been widely used. The vapor space between the vessel and the jacket is evacuated of all air and other permanent gases (which would seriously interfere with the heat transfer) and the system then operates at an absolute pressure which is established by the temperature of the working fluid, this temperature being the balance between the rates of heat input to the liquid and the rate of vapor condensation on the exterior of the vessel. With water as the working fluid, when at room temperature, this pressure can fall to well under one inch mercury absolute. The condensate forming on the vessel exterior drains down and drips back into the boiling pool at the bottom of the jacket.

The usual method of firing the jacket is to place a burner under it, and to enclose the space around the jacket with an insulated shell so that the hot gases from the burner wash over the jacket bottom and walls and thereby heat and boil the contained working fluid. Such practice leads to a bulky, expensive construction, and even with the addition of fins or the like to the jacket exterior, the heat absorption is slow and the overall efficiency not high. Although the overall result of this orthodox construction has been broadly used, the industry has spent considerable time and effort in trying to develop an improved means for heating these vessels.

One attempt at improvement has been to provide a tubular evaporator which protrudes from the jacket, this evaporator being lined with a wick so that the assembly performs as a heat pipe. Such wicked heat pipes, however, have relatively low heat moving capacity for any given diameter, and for many applications in which these jacketed vessels are utilized, their use results in a construction so large as to be uneconomical and unacceptable. A tubular evaporator of this type, and one which is typical of this configuration, is shown in U.S. Pat. No. 3,791,372, wherein the very large cross-section of the evaporator tube is clearly apparent.

SUMMARY OF THE INVENTION

In accordance with the present invention, an improved, more efficient and less costly fired evaporator for these vapor jacketed vessels is provided by utilizing a heat transfer arrangement in which the evaporator is one or more fired wickless tubes. More particularly, these tubes are so constructed as to permit high heat input rates, thus making the evaporator portion of the assembly small, highly efficient, low in cost and easy to fire.

Such a system is not difficult to construct if the jacket is operationally sealed, that is, for example, hermetically sealed, and charged with a known quantity of a highly purified working fluid. The reliability, durability and general safety records of such hermetically sealed systems, however, are not good, and many inspection authorities will not accept the usual rupture discs or fusable plugs included as over-pressure/over-temperature protection.

Another major problem with all hermetically sealed systems is the formation of non-condensible gases over a period of time, which gases seriously interfere with the heat transfer. These gases can generate from the breakdown of the compounds constituting the working fluid, or in the case of water, from the reaction of the oxygen in the water with the metals in the vessel or jacket, liberating hydrogen.

The above, as well as other related problems, are overcome in the present invention by the inclusion of the standard safety equipment such as pressure relief valves, gauge glasses, over-pressure and over-temperature cutoffs and the like. Since these devices inherently leak, even if only slowly, occasional venting must be provided for, and this will result in a vapor loss so that periodic addition of working fluid will be necessary. In the case of water, addition from the usual sources will introduce gases dissolved therein as well as dissolved minerals. Therefore, a procedure is required for venting the dissolved gas, release as the water is heated, and this can be accomplished through the pressure relief valve when the jacket pressure has been brought above atmospheric. Precipitation of a portion of the dissolved solids in the water may occur, but since the system does not involve the use of wicks common to the usual heat pipe, the small quantity of these solids will not pose a problem for many years of ordinary use. For longest operation before cleanout, distilled or demineralized water is obviously best.

Since most of these vessels are used by unskilled operators who have little or no understanding of the need for liquid level maintenance, their periodic additions of liquid result in widely varying final levels, and in order to be safe, the operator is instructed to maintain the liquid level on the high side.

The introduction of safety equipment and the inexpert operator, therefore, presents entirely different and much more difficult problems for the designer than does the typical hermetically sealed system. The present invention overcomes these problems and includes elements which assure efficient, safe operation of a broad class of fired, jacketed vessels that utilize as their evaporator high input tubular heat receptors, thus keeping the evaporator section small, low in cost, and practical to operate.

OBJECT OF THE INVENTION

Accordingly, it is an object of the present invention to provide an improved fired-tube vapor generator.

A further object is to provide improvements in vapor jacketed cooking vessels which integrally contain fired-tube vapor generators, thus making them independent of outside vapor supply.

Still another object of the present invention is to provide improved vapor jacketed cooking vessels with integral fired-tube vapor generators which can accommodate standard over-pressure/over-temperature protective devices and variable liquid levels.

BRIEF DESCRIPTION OF THE DRAWINGS

The invention as illustrated in the accompanying drawings, which are diagrammatic, and in which:

FIG. 11 is a partial side plan view of the steam jacketed cooking vessel of FIG. 10;

FIG. 12 is a partial end plan view of the steam jacketed cooking vessel of FIG. 10;

FIG. 13 is a partial sectionalized plan view of still another steam jacketed cooling vessel illustrating the construction of the fired, tubular evaporator utilized therewith; and FIG. 14 is a partial end plan view of the steam jacketed cooking vessel of FIG. 13.

DESCRIPTION OF THE SPECIFIC EMBODIMENT

Figure 1:
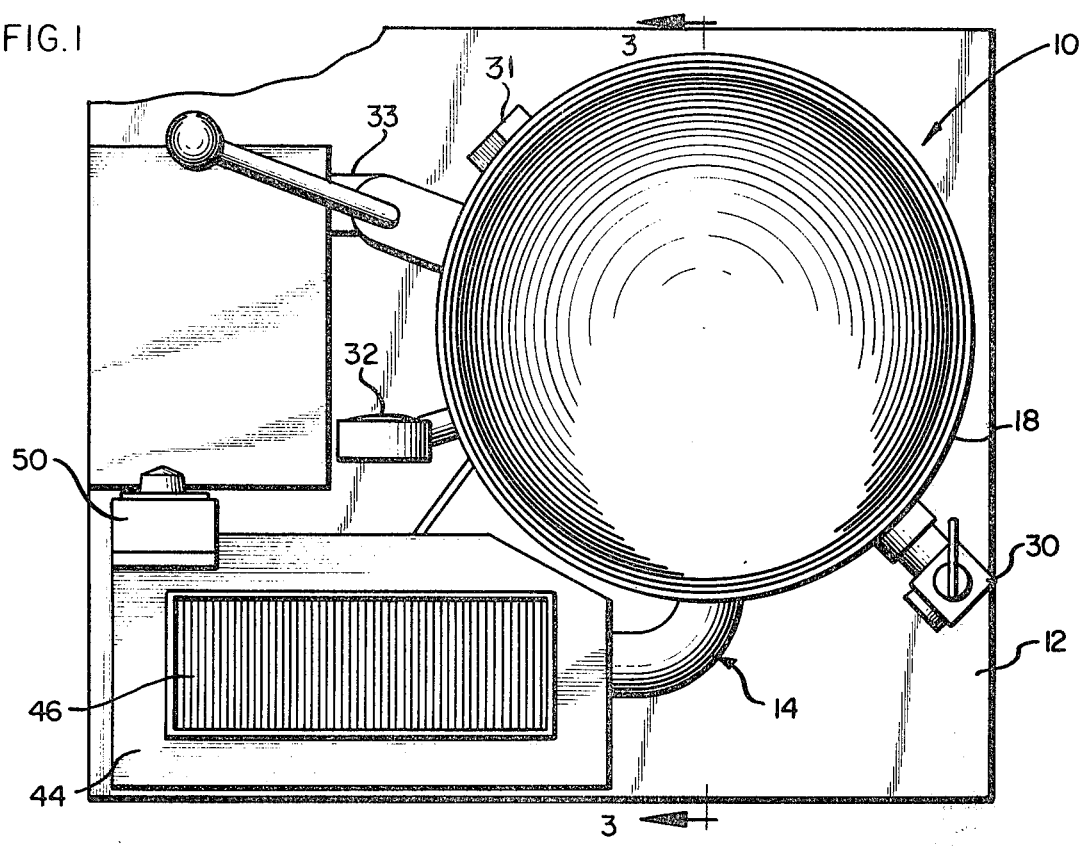
FIG. 1 is a top plan view of a steam jacketed cooking vessel exemplary of a first embodiment of the invention.

Referring now to the drawings, in FIGS. 1-4 there is disclosed a steam jacketed cooking vessel 10 exemplary of a first embodiment of the invention, including a platform 12 which forms a base for the vessel and upon which the latter and a heat source 40 are supported. The vessel 10 is of a generally conventional construction and comprises a kettle 16 for receiving therein a product to be heated. The kettle 16 has side walls 18 and a bottom wall 20. A steam jacket 22 having side walls 24 and a bottom wall 26 is disposed about the outer periphery of the kettle 16 such that a sealed enclosure or cavity 27 is provided between the bottom wall 20 and a portion of the side walls 18 of the kettle 16 and the steam jacket 22. A working fluid 28 which, in the illustrated embodiment, comprises water is contained within the sealed cavity 27. As indicated above, a working fluid 28 other than water can be utilized.

Figure 2:
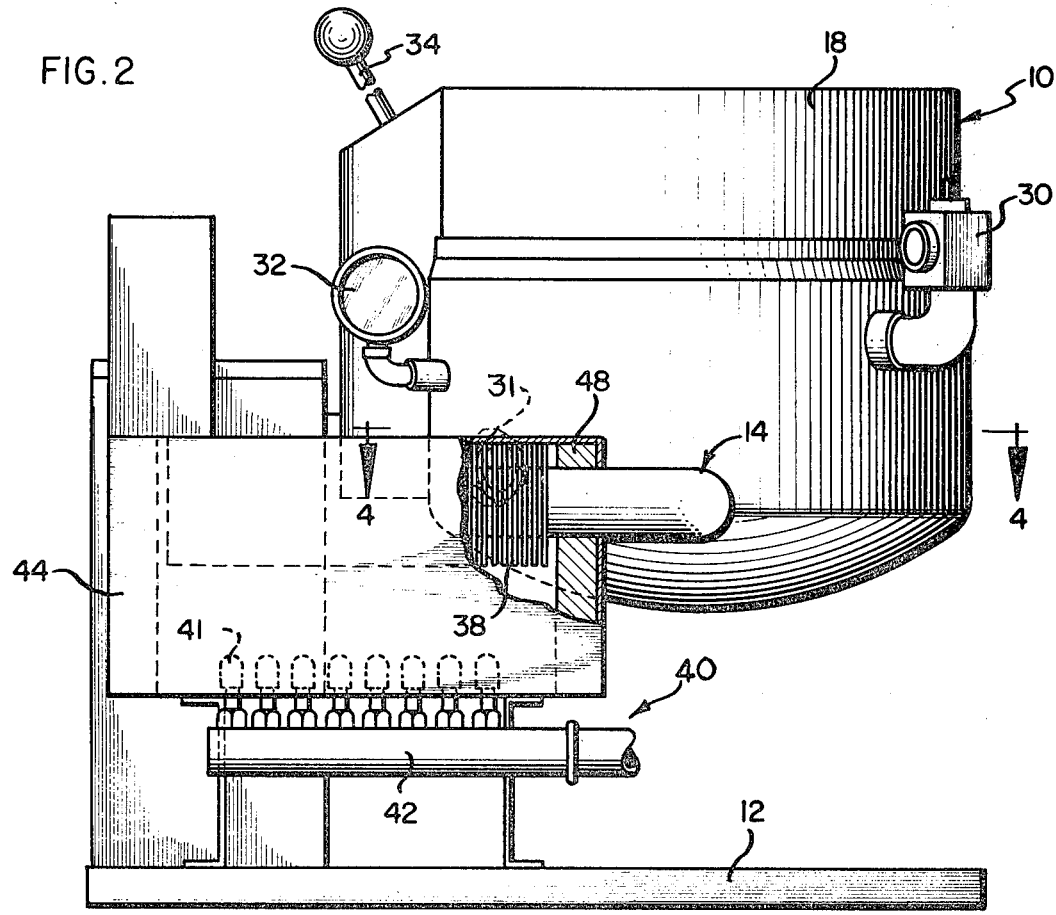
FIG. 2 is a side plan view of the steam jacketed cooking vessel of FIG. 1, partially sectionalized.
Figure 3:
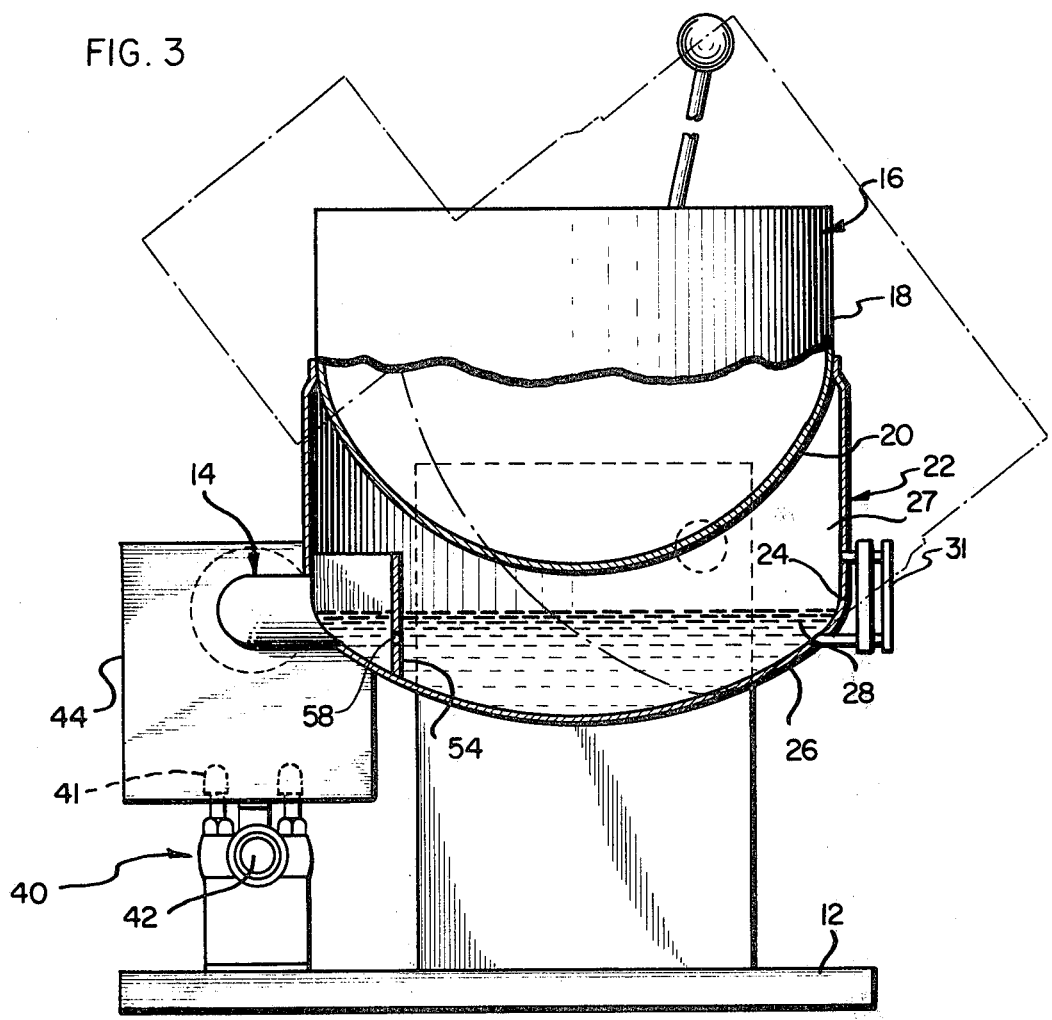
FIG. 3 is a sectional view taken substantially along lines 3—3 of FIG. 1.
Figure 4:
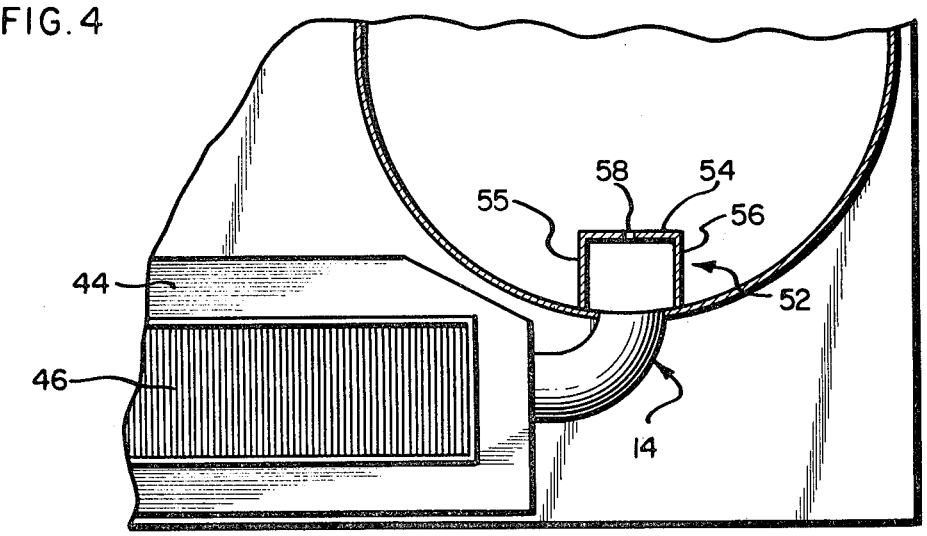
FIG. 4 is a fragmented view, partially sectionalized, to illustrate the stack or reservoir contained within the steam jacket.

As can be best seen in FIGS. 1 and 2, the cooking vessel 10 is provided with a safety relief valve 30, a gauge glass 31 and a pressure gauge 32. The cooking vessel 10 also can be pivotally supported by an assembly 33 and has a handle 34, to permit it to be pivotally rotated about a horizontal axis so that a product can be poured from it. These features are optional but conventional with presently available steam jacketed cooking vessel, and form no part of the present invention.

In accordance with the present invention, the cooking vessel 10 is provided with a fired, tubular evaporator 14 for generating the hot vapor for heating the kettle 16, and the product contained therein. The tubular evaporator 14 in the illustrated embodiment, is fired with a gas-fired burner assembly 40 including a number of burner nozzles 41 arranged in parallel rows beneath and in close proximity to the tubular evaporator 14 so as to heat the latter. The burner nozzles 41 are supplied fuel by a manifold 42 which is, in turn, coupled to a source of fuel (not shown). A housing 44 having a vent 46 in the top wall thereof and insulation 48 disposed therein is provided about the tubular evaporator 14 and the burner assembly 40. The tubular evaporator 14 also can be provided with a number of radially extending heat absorbing fins 38 to improve efficiency if desired. The housing 44 can be secured to the tubular evaporator 14 and pivotally tilted with it if the cooking vessel 10 is pivotally rotated to pour a product from it, as more fully described below. The gas-fired burner assembly 40, on the other hand, may be fixedly mounted on and secured to the platform 12 so as to remain stationary when the cooking vessel 10 is pivotally tilted.

As indicated above, the burner nozzles 40 and the manifold 42 can be secured to the platform 12. The tubular evaporator 14 and the housing 44 can be secured to and movable with the cooking vessel 10. Accordingly, when it is desired to pour the product from the cooking vessel 10, the latter can be tilted or pivotally rotated in substantially the same fashion as presently available cooking vessels, only in this case, the tubular evaporator 14 and the housing 44 provides a shield to provide a safety feature to prevent a user from accidental burns, as a result of touching or otherwise contacting the hot tubular evaporator 14. While not shown, a cut-off valve which is operated to cut off the gas-fired burner when the cooking vessel 10 is tilted is preferably provided for similar reasons. Ignition means can likewise be provided to re-ignite the gas-fired burner when the cooking vessel 10 is returned to its original static position, if desired. Again, such cut-off valves and ignition means are well-known in the art and form no part of the present invention.

The tubular evaporator 14 is open-ended at one end, with that open end being in communication with the cavity 27 between the walls of the kettle 20 and the jacket 22 of the cooking vessel 10. More particularly, in the embodiment illustrated in FIGS. 1-4, the open end of the tubular evaporator 14 opens through the wall of the jacket 22 into the cavity 27 containing the working fluid 28. The tubular evaporator 14 is positioned or located with respect to the walls of the jacket 22, so as to permit the working fluid 28 to flow into it, such that the working fluid 28 likewise is utilized as the working fluid in the tubular evaporator 14. The evaporator 14 where it extends through the walls of the jacket 22 is welded or otherwise affixed to the jacket so as to form a sealed connection.

In this arrangement, the working fluid must flow into the open end of the tubular evaporator 14 in opposite direction to the issuing vapor. When the absolute pressure in the jacket 22 is very low and the specific volume of vapor is very high, this type of arrangement must be operated with care to avoid problems. In particular, the heat input to the tubular evaporator 14, and, therefore, the evaporation rate, must be kept below that which will generate such high vapor volume that the working fluid is prevented from flowing back into the tubular evaporator. A sufficient amount of working fluid must flow into the tubular evaporator to keep it sufficiently wet to prevent burning it or, more likely, any attached fins, particularly when the absolute pressure in the evaporator tube and liquid level are at a minimum.

With water as working fluid, an operable arrangement of the above type utilized a horizontal two inch schedule 40 pipe for the tubular evaporator, with four 3.25 inch OD fins/inch exteriorly fired to approximately 2.5 MBtu/hr/inch of finned length for a total finned length of 10 inches and total firing rate of approximately 25 MBtu/hr. A minimally satisfactory tube wetness at very low absolute pressure resulted, if the water level was maintained at more than at least the mid line of the evaporator tube under cold (no boiling) condition.

Sloping the evaporator tube 14 downwardly toward its outboard closed end will improve the ability of the working fluid to flow into it, with a slope of approximately 9° being highly beneficial in most cases, although the greater the slope, the greater the ability of the working fluid to flow into it. However, this slope is often undesirable in that it requires increasing the overall height of the cooking vessel assembly and, on small cooking vessels, the working height is often of utmost importance. Sloping the evaporator tube 14 upward toward its closed end is detrimental to this configuration.

When an evaporator tube 14 of this configuration is used, improved results during start-up from cold may be achieved by providing an open stack or reservoir 52 having a front wall 54 and side walls 55 and 56 within the steam jacket 22, about the open end of the tubular evaporator 14. The front and side walls 54, 55 and 56 of the stack 52 are of a height to extend some distance above the level of the working fluid conventionally provided or utilized in the vapor jacket 22, and an aperture 58 is provided in the front wall 54 through which the working fluid can enter the stack 52 and the tubular evaporator 14. The aperture 58 is located below the minimum level of the working fluid. This construction provides a relatively small reservoir of working fluid at the open end of the evaporator tube, which small quantity will be heated rapidly by the vapors exiting the tube. Two gains result. First, the heating and boiling in the tube get off to a faster, smoother start since within a few seconds after firing is started the incoming liquid is heated and therefore does not cause precipitous condensation and collapse of vapor bubbles. Such a violent collapse causes surging and general instability in the evaporator tube and prevents establishment of an orderly inflow of liquid and outflow of vapor. Second, the sharp, loud noise and pounding accompanying the vapor bubble collapse are eliminated. Obviously the above purposes can be accomplished by a wide range of stack shapes. Also, a single stack can enclose the open ends of a number of evaporator tubes so long as the enclosed liquid volume is kept relatively small.

The vaporized working fluid flows from the tubular evaporator into the jacket 22 where it condenses on the surfaces of the kettle 16 surrounded by the jacket 22. Simultaneously, the evaporator 14 is replenished with working fluid as the latter flows from the jacket 22 through the aperture 58 into the stack 52, and thence, into tube 14. The vaporized working fluid condenses on the surface of the kettle 16, and the heat energy is released to heat the kettle wall 16 and thereby the product contained in it. The condensed working fluid drains back and is mixed into the working fluid in the jacket 22, with the process of vaporizing and condensing the working fluid to transfer heat energy to the kettle 16 being a continuous cycle so long as the tubular evaporator 14 is heated.

Normally, and preferably, at some time after startup, when the pressure reaches an above-atmospheric level, the pressure relief valve 30 or other means is momentarily manually operated to release any air which has seeped into and is effectively trapped in the jacket 22 as a result of leakage through the connections of the pressure gauge 32, gauge glass 31 and pressure relief valve 30 to the jacket 22.

The temperature of the cooking vessel 10, or the product contained therein, can be controlled in any conventional fashion, by controlling the gas-fired burner 14 by means of a thermostat 50 which may sense either the product temperature or the temperature of the working fluid in the jacket 22. The gas-fired burner 14 also may be controlled by the vapor pressure in jacket 22.

Figure 5:
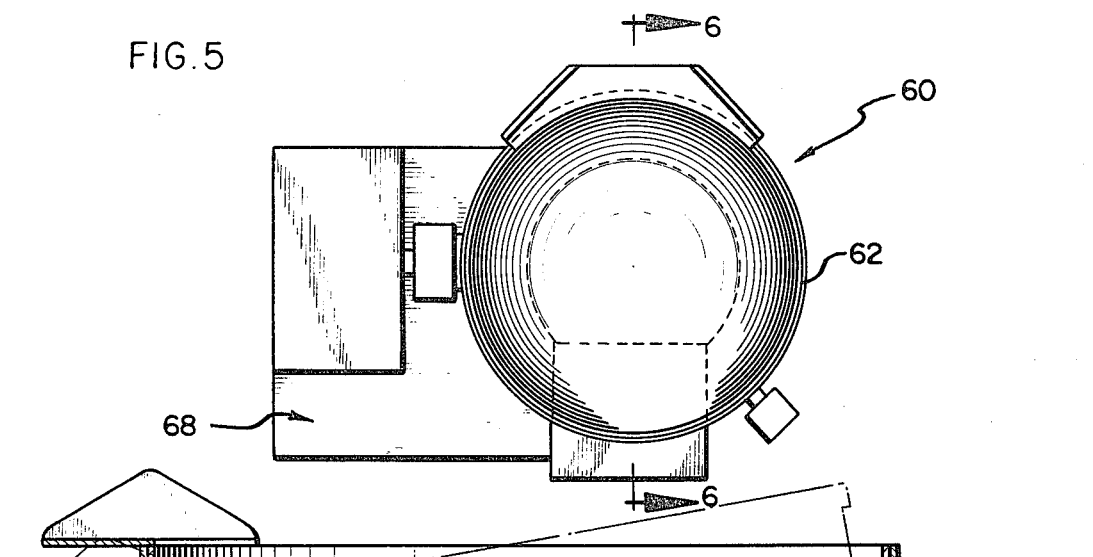
FIG. 5 is a top plan view of a steam jacketed cooking vessel exemplary of another embodiment of the invention.
Figure 6:
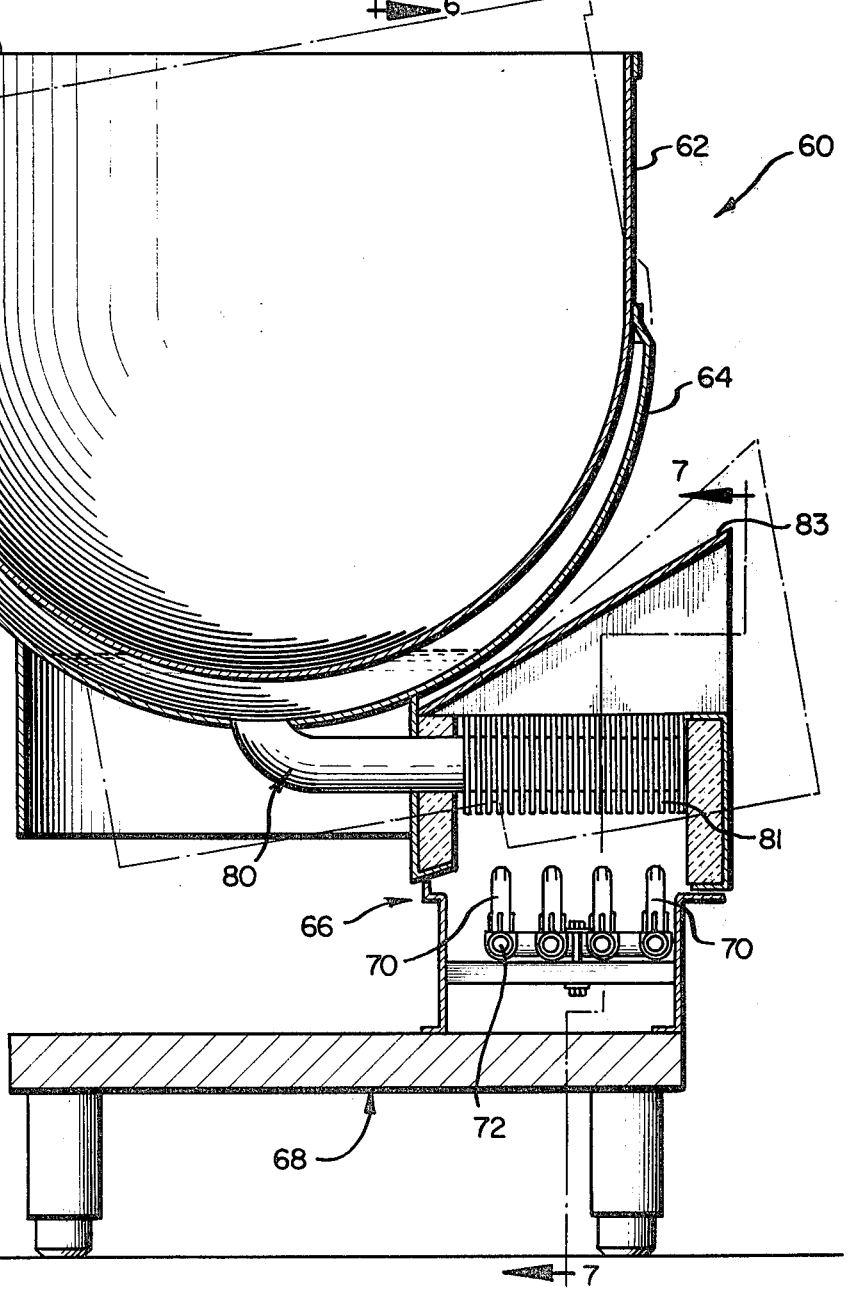
FIG. 6 is a sectional view taken substantially along lines 6—6 of FIG. 5.
Figure 7:
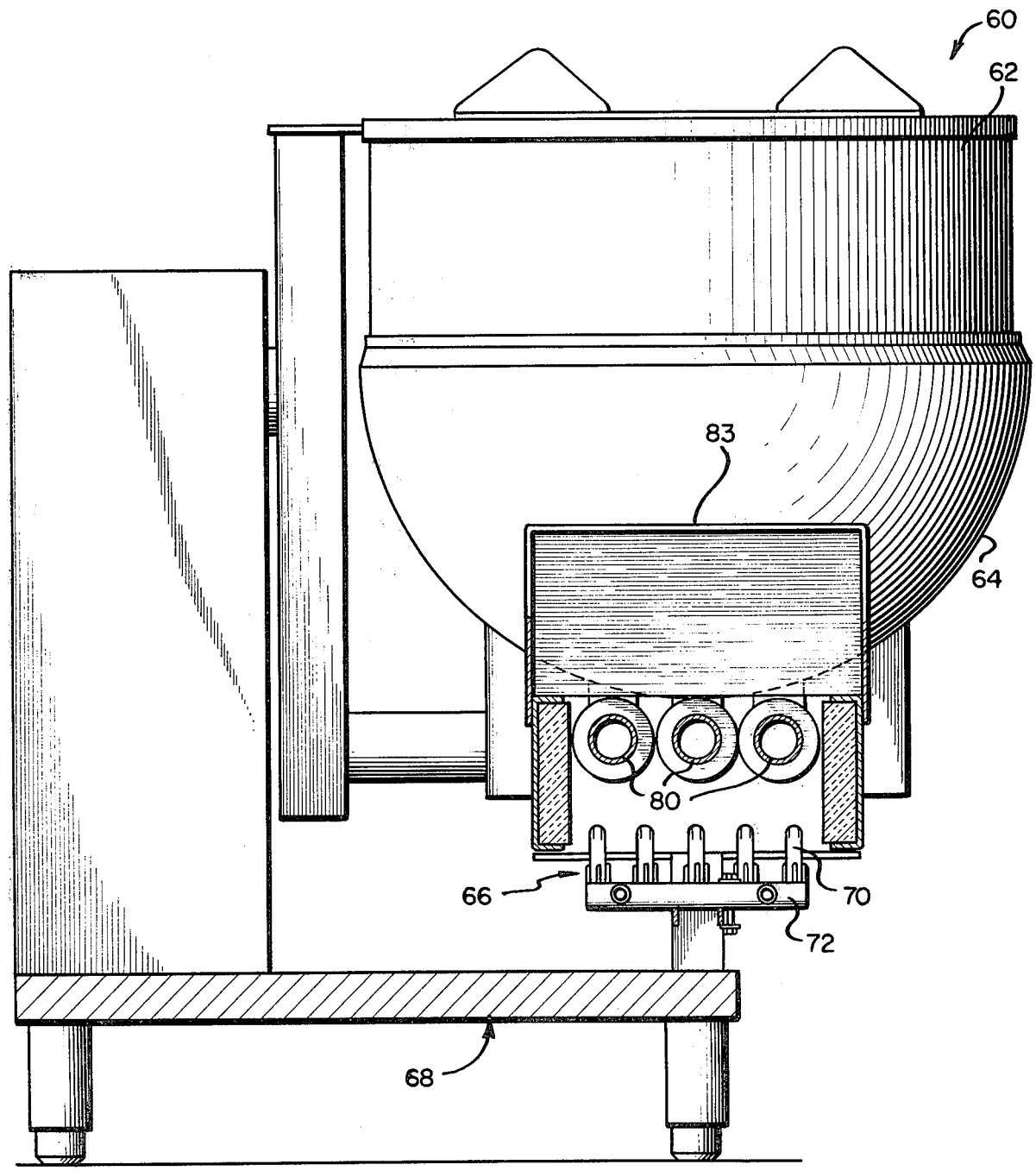
FIG. 7 is a side plan view of the steam jacketed cooking vessel of FIGS. 5 and 6, partially sectionalized to illustrate the fired, tubular evaporators utilized therewith.

In FIGS. 5–7, there is illustrated a cooking vessel 60 exemplary of another embodiment of the invention. The cooking vessel 60 is generally of the same construction as the cooking vessel 10, and includes a kettle 62 having a jacket 64 about its lower portion and a source of heat 66. The cooking vessel 60 is shown tiltably supported above a platform 68, and the latter supports a gas-fired burner which, as illustrated, includes a number of burner nozzles 70 that are arranged in four parallel, spaced-apart rows. The burner nozzles 70 are supplied fuel by a manifold 72 which is, in turn, coupled to a source of fuel (not shown).

As can be best seen in FIG. 7, three tubular evaporators 80 are provided and are in communication with the interior of the steam jacket 64. In this case, the tubular evaporators 80 extend into the steam jacket 64 at the bottom thereof, and further are positioned to be heated by the gas fired burner 66. The tubular evaporators may be provided with heat absorbing fins 81 or the like. A housing 83 is provided for splash shielding and directing the exhaust combustion gases exiting the evaporators 80, and can be affixed to the cooking vessel 60 and the evaporators 80 to tilt with the latter, for reasons set forth above.

The cooking vessel 60 operates in substantially the same manner as described above. The working fluid in the jacket 64 also functions as the working fluid for the tubular evaporators 80. The working fluid is vaporized in the evaporators 80, flows into the jacket 64 and condenses on that portion of the surface of the kettle surrounded by the jacket 64. As the vaporized working fluid condenses, heat energy is transferred to the kettle 62 and the product contained therein. As the liquid working fluid drains down, it again mixes with the working fluid reserve in the jacket 64, and eventually flows once again into the evaporators 80.

Figure 8:
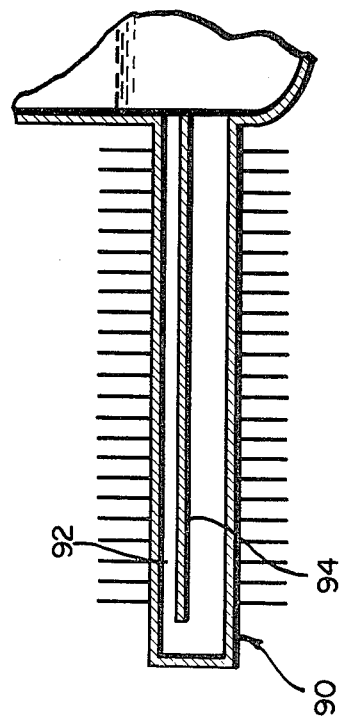
FIG. 8 is a partial sectionalized view of a steam jacketed cooking vessel illustrating still another exemplary embodiment of a fired, tubular evaporator used therewith.

In FIG. 8, there is illustrated still another tubular evaporator 90 which is essentially of the same construction and operation as the evaporators described above. The tubular evaporator 90, however, is provided with a vapor passageway 92 in the upper portion of the tube to conduct the vapor to the jacket while keeping the vapor out of contact with the counter flowing, incoming working fluid. This vapor passageway 92 is provided by affixing a duct 94 in the tubular evaporator 90. This duct 94 spans across the width of the tubular evaporator 90 and terminates near its closed end. The vapor or steam generated is washed along with the incoming working fluid toward the closed end of the tubular evaporator 90, whereat it flows upward into the vapor passageway 92 and back into the jacket of the cooking vessel. This arrangement eliminates the serious disturbance of the vapor/incoming working fluid interface and allows both to flow much more positively and with less pressure drop.

Figure 9:
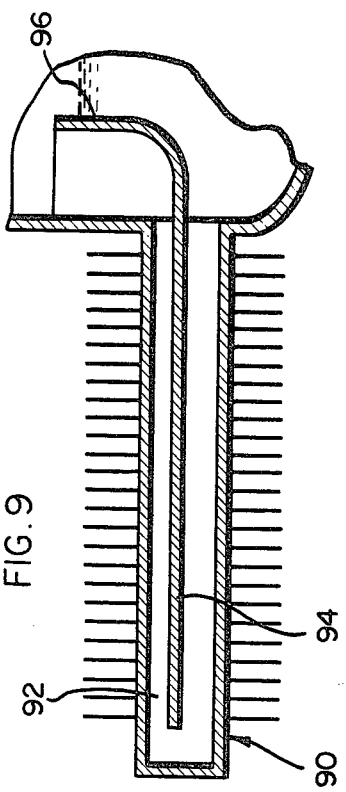
FIG. 9 is a partial sectional view similar to FIG. 8, illustrating still another improvement to the fired, tubular evaporator.

The vapor passageway 92 can be made more effective by providing an upturned exit duct 96 at its open end interiorly of the vapor jacket, as illustrated in FIG. 9. This exit duct 96 extends at least up to the usual level of the working fluid in the jacket, and can be slightly above this level, with the result being that a driving head is set up to force circulation of the working fluid into the bottom portion of the tubular evaporator 90 and the vapor out of its upper portion, through the vapor passageway 92.

The vapor passageway 92 should be substantial in size to accommodate operation at the minimum jacket pressure. For example, the vapor passageway 92 may comprise approximately one third of the upper portion of the cross-sectional area of the tubular evaporator. The vapor passageway 92 improves the operation of the tubular evaporator 90 when it is horizontal, but a small slope downwardly towards its closed end may be helpful. If the exit duct 96 is provided and extends to a level well above the top of the fluid level, the tubular evaporator may be mounted with a negative slope rising toward its closed end. However, with this arrangement, the liquid inflow is reduced and circulation is less positive, hence there is some disadvantage in doing so.

Figure 10:
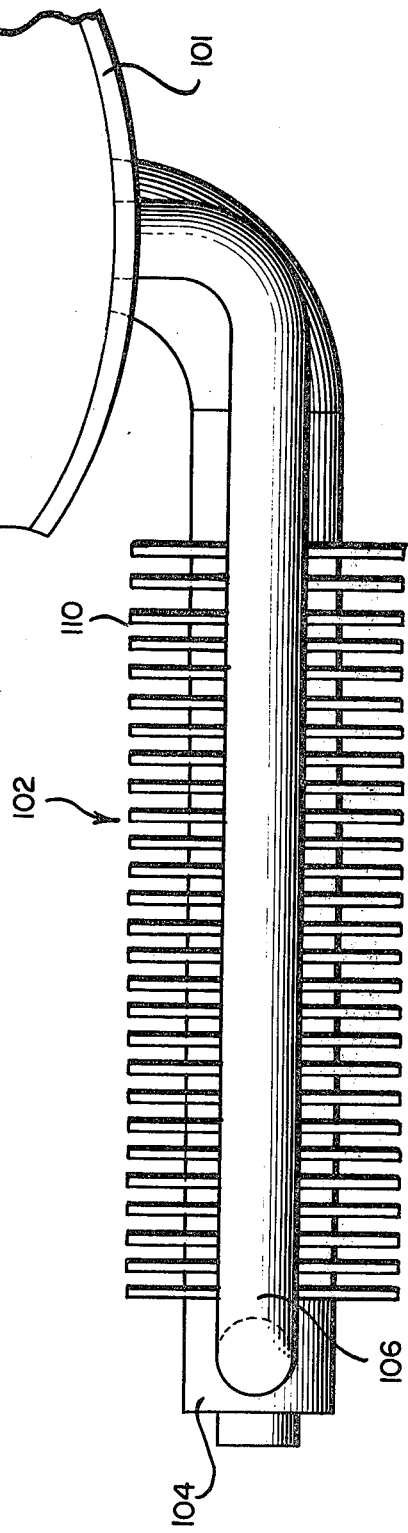
FIG. 10 is a partial top plan view of a steam jacketed cooking vessel illustrating still another and preferred embodiment of the construction of the fired, tubular evaporator used in conjunction therewith.

In FIGS. 10-12, there is illustrated a portion of still another jacketed cooking vessel 10 which is constructed in accordance with a preferred embodiment of the invention. The cooking vessel 10 is substantially like that disclosed in FIGS. 1-4, and only differs from the latter in the construction and arrangement of the evaporator assembly 102 used in conjunction with it.

More particularly, the evaporator assembly 102 includes a tubular evaporator 104 which is generally of the same construction and is affixed to the cooking vessel 100 in the same fashion as the tubular evaporator 14 described above. In this case, however, the tubular evaporator 104 is provided with an external vapor conduit 106 in the form of a hollow tube one end of which is affixed to the top side of the tubular evaporator 104 adjacent its outboard closed end, and in communication with the interior of the tubular evaporator 104. The opposite end of the vapor conduit 106 is affixed to the wall of the vapor jacket 101 of the cooking vessel 100, in communication with the interior of the jacket. With this arrangement, the vapor conduit 106 provides a large passageway for the vapor to the jacket 101, and the entire cross-sectional area of the tubular evaporator 104 is available to carry the incoming working fluid and the vapor that is generated along with it to the far end of the tubular evaporator.

The entrance of the vapor conduit 106 into the jacket 101 preferably is essentially at or above the usual level of the working fluid in the jacket 101, although the entrance point is not critical, and satisfactory operation is obtained with the entry anywhere from the top of the tubular evaporator upward. Hot gases from the gas-fired burner can be allowed to flow over the vapor conduit 106 provided the hot gases have first flowed over the lower tubular evaporator 104 of the evaporator assembly 102 and have been substantially cooled. As indicated above, fins 110 for high heat absorption can be added to the tubular evaporator, but are not necessary or even desirable on the vapor conduit 106.

The disclosed arrangement is particularly applicable for use with long, small, tubular evaporators which are heavily fired (and probably heavily finned). For example, experiments have shown that a tubular evaporator working with a water charge and consisting of schedule 40 pipe, 1½ inch nominal diameter (1.61 inch ID) with four 16 gauge fins per inch attached externally and with a 3.25 inch outer diameter, fired at the rate of approximately 3.6 MBtu/hour/running inch over a total finned length of 10 inches and with a vapor conduit 106 of 1 inch inner diameter, the tubular evaporator 104 at its outboard closed end is kept over half full of working fluid, even at an absolute pressure in the tubular evaporator 104 of less than 1" Hg.

In FIGS. 13 and 14, there is illustrated still another jacketed cooking vessel 112 which is generally like the vessel shown in FIGS. 5-7. In this illustrated embodiment, the cooking vessel 112 is provided with an evaporator assembly 114 including three tubular evaporators 116-118, each having a vapor conduit 119-121, respectively. In this case also, the vapor conduits 119-121 provide a vapor passageway from the outboard closed end of the tubular evaporators 116-118 to the interior of the jacket of the cooking vessel 112, so that the entire cross-sectional area of each of the tubular evaporators 116-118 is available to carry the incoming working fluid. The tubular evaporators 116-118 also can be provided with heat absorbing fins 122.

With the arrangements shown in FIGS. 10-15, a wide range of slopes of the tubular evaporator 104 can be tolerated, although an incline downward toward the outboard closed end of the evaporator is detrimental in that the vapor bubbles formed must be washed "downhill" before they can reach the vapor conduit 106. Mounting the tubular evaporator 104 horizontally or with a slope upward toward the outboard closed end will provide optimum performance.

From the above description, it can be seen that an improved vapor jacketed cooking vessel is provided and, particularly, an improved vapor generator for such cooking vessels. The generator can comprise simply a tubular evaporator which is heated to generate the steam or vapor for heating the cooking vessel, but preferably and advantageously, a vapor passageway is provided for conveying the generated vapor or steam from the evaporator to the jacket. This vapor passageway can be integrally formed with the tubular evaporator by, for example, providing a duct within the evaporator itself or, alternatively, by providing an external vapor conduit which extends from the tubular evaporator to the interior of the steam jacket. Further still, the tubular evaporator could have a tubular extension which is simply bent upwardly and reversibly around to connect to the interior of the vapor jacket. Other similar changes in construction likewise are contemplated with the illustrated embodiments merely being representative.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative, and not in a limiting sense.

Now that the invention has been described, what is claimed as new and desired to be secured by Letters Patent is:

1. A vapor jacketed cooking vessel comprising a kettle having a bottom and side walls for receiving and containing therein a product to be heated; a vapor jacket disposed about all or a portion of the bottom and side walls of said kettle; and a working fluid contained within said vapor jacket; the improvement comprising a means for heating said kettle and a product contained therein, said means comprising at least one tubular evaporator having one closed end and one open end, said open end being affixed to said vapor jacket so that said working fluid flows into and floods said evaporator and functions as the working fluid therein, said working fluid in said vapor jacket functioning as a reservoir of working fluid for said evaporator to maintain sufficient working fluid in said evaporator to prevent burning said evaporator at high heat inputs, said vapor jacket and said tubular evaporator defining a space which is operationally sealed, essentially free of non-condensible gases and partially filled with said working fluid, means for heating said tubular evaporator to vaporize said working fluid flowing into it from said reservoir in said vapor jacket and a vapor conduit having one end thereof affixed in open communication to said tubular evaporator adjacent said closed end thereof and its other end affixed in open communication with said vapor jacket for conveying said vaporized working fluid from said evaporator into sid vapor jacket the entrance of said one end of said vapor conduit being above said evaporator and above the usual level of said working fluid in said vapor jacket, said working fluid upon being vaporized flowing to and condensing on that portion of said kettle surrounded by said vapor jacket, whereby said kettle and the product therein is heated by the thermal energy stored in the heat of evaporation of said fluid.

2. The vapor jacketed cooking vessel of claim 1, wherein said means for heating said tubular evaporator comprises a gas flame.

3. The vapor jacketed cooking vessel of claim 1, further comprising frame means for tiltably supporting said vessel, said tubular evaporator being affixed to said steam jacket and being tilted with said vessel, said means for heating said tubular evaporator being fixed.

* * * * *